(12) United States Patent
Chen et al.

(10) Patent No.: US 12,238,279 B2
(45) Date of Patent: Feb. 25, 2025

(54) BI-PREDICTION REFINEMENT IN AFFINE WITH OPTICAL FLOW

(71) Applicant: InterDigital CE Patent Holdings, SAS, Paris (FR)

(72) Inventors: Ya Chen, Cesson-Sevigne (FR); Franck Galpin, Cesson-Sevigne (FR); Fabrice Leleannec, Cesson-Sevigne (FR); Antoine Robert, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 545 days.

(21) Appl. No.: 17/611,699

(22) PCT Filed: Jun. 23, 2020

(86) PCT No.: PCT/EP2020/067545
§ 371 (c)(1),
(2) Date: Nov. 16, 2021

(87) PCT Pub. No.: WO2021/001220
PCT Pub. Date: Jan. 7, 2021

(65) Prior Publication Data
US 2022/0264146 A1    Aug. 18, 2022

(30) Foreign Application Priority Data
Jul. 1, 2019  (EP) ..................... 19305885

(51) Int. Cl.
*H04N 19/107* (2014.01)
*H04N 19/105* (2014.01)
(Continued)

(52) U.S. Cl.
CPC ......... *H04N 19/107* (2014.11); *H04N 19/105* (2014.11); *H04N 19/176* (2014.11);
(Continued)

(58) Field of Classification Search
CPC .................................................. H04N 19/577
See application file for complete search history.

(56) References Cited

U.S. PATENT DOCUMENTS

2020/0169748 A1* 5/2020 Chen ..................... H04N 19/521
2020/0221117 A1* 7/2020 Liu ......................... H04N 19/56
(Continued)

FOREIGN PATENT DOCUMENTS

| CA | 3131311 A1 * | 9/2020 | ........... H04N 19/107 |
| CA | 3144099 A1 * | 12/2020 | ........... H04N 19/105 |

(Continued)

OTHER PUBLICATIONS

Machine translation of TW-202025766-A (Year: 2020).*
(Continued)

*Primary Examiner* — David N Werner
(74) *Attorney, Agent, or Firm* — Xiaoan Lu

(57) ABSTRACT

PROF (Prediction Refinement with Optical Flow) and BDOF (Bi-directional Optical Flow) use the optical flow model to provide sample-wise motion compensation refinement. In one implementation, to calculate the spatial gradients in BDOF, an extended region is generated around a block to be coded. To simplify the computation, BDOF may use the same padding operations as in PROF, namely, a padding sample is copied from the nearest integer neighbor in the reference picture. BDOF and PROF can also be used together when sub-block based affine motion-compensated prediction is used. BDOF can be applied after PROF generates new prediction blocks, or BDOF can use the spatial gradients in the original prediction blocks to re-use the computations with PROF. In addition, BDOF and PROF operations can be combined, and the prediction adjustment will be directly based on the spatial gradients in the original prediction blocks.

16 Claims, 9 Drawing Sheets

(51) Int. Cl.
  *H04N 19/176* (2014.01)
  *H04N 19/513* (2014.01)
  *H04N 19/577* (2014.01)
  *H04N 19/523* (2014.01)
  *H04N 19/563* (2014.01)

(52) U.S. Cl.
  CPC ......... *H04N 19/513* (2014.11); *H04N 19/577* (2014.11); *H04N 19/523* (2014.11); *H04N 19/563* (2014.11)

(56) References Cited

U.S. PATENT DOCUMENTS

| | | | | |
|---|---|---|---|---|
| 2020/0351495 | A1* | 11/2020 | Li | H04N 19/196 |
| 2020/0366928 | A1* | 11/2020 | Liu | H04N 19/176 |
| 2020/0382795 | A1* | 12/2020 | Zhang | H04N 19/137 |
| 2020/0413082 | A1* | 12/2020 | Li | H04N 19/159 |
| 2021/0051339 | A1* | 2/2021 | Liu | H04N 19/176 |
| 2021/0144400 | A1* | 5/2021 | Liu | H04N 19/184 |
| 2021/0226585 | A1* | 7/2021 | Khlat | H03F 3/68 |
| 2021/0227211 | A1* | 7/2021 | Liu | H04N 19/59 |
| 2021/0227250 | A1* | 7/2021 | Liu | H04N 19/105 |
| 2021/0274213 | A1* | 9/2021 | Xiu | H04N 19/577 |
| 2021/0329257 | A1* | 10/2021 | Sethuraman | H04N 19/119 |
| 2021/0367203 | A1* | 11/2021 | Pi | H10K 71/00 |
| 2021/0368198 | A1* | 11/2021 | Zhang | H04N 19/513 |
| 2021/0368199 | A1* | 11/2021 | Zhang | H04N 19/513 |
| 2021/0368203 | A1* | 11/2021 | Zhang | H04N 19/176 |
| 2021/0385481 | A1* | 12/2021 | Liu | H04N 19/105 |
| 2021/0385482 | A1* | 12/2021 | Liu | H04N 19/513 |
| 2022/0046249 | A1* | 2/2022 | Xiu | H04N 19/513 |
| 2022/0060690 | A1* | 2/2022 | Sethuraman | H04N 19/513 |
| 2022/0094974 | A1* | 3/2022 | Toma | H04N 19/176 |
| 2022/0103827 | A1* | 3/2022 | Liu | H04N 19/52 |
| 2022/0116655 | A1* | 4/2022 | Xiu | H04N 19/159 |
| 2022/0182658 | A1* | 6/2022 | Xiu | H04N 19/139 |
| 2022/0210462 | A1* | 6/2022 | Luo | H04N 19/55 |
| 2022/0232244 | A1* | 7/2022 | Li | H04N 19/159 |
| 2022/0286688 | A1* | 9/2022 | Chen | H04N 19/176 |
| 2024/0121431 | A1* | 4/2024 | Xiu | H04N 19/159 |

FOREIGN PATENT DOCUMENTS

| | | | | |
|---|---|---|---|---|
| CA | 3144797 | A1 * | 12/2020 | H04N 19/105 |
| CA | 3145056 | A1 * | 12/2020 | H04N 19/105 |
| TW | 202025766 | A * | 7/2020 | H04N 19/109 |
| WO | WO-2020003260 | A1 * | 1/2020 | H04N 19/105 |
| WO | WO-2020016857 | A1 * | 1/2020 | H04N 19/117 |
| WO | WO-2020058890 | A1 * | 3/2020 | H04N 19/109 |
| WO | WO-2020070729 | A1 * | 4/2020 | H04N 19/119 |
| WO | WO-2020084476 | A1 * | 4/2020 | H04N 19/105 |
| WO | WO-2020251419 | A2 * | 12/2020 | H04N 19/109 |

OTHER PUBLICATIONS

A. Alexander & A. Elena, "Bi-directional optical flow for future video codec", 2016 Data Compression Conf. 83-90 (Apr. 2016) (Year: 2016).*

A. Alshin, E. Alshina, & T. Lee, "Bi-Directional Optical Flow for Improving Motion Compensation", 28 Picture Coding Symp. 422-425 (Dec. 2010) (Year: 2010).*

H. Gao, S. Esenlik, Z. Zhao, E. Steinbach, & J. Chen, "Decoder Side Motion Vector Refinement for Versatile Video Coding", presented at 21 IEEE Workshop on Multimedia Signal Processing (Sep. 2019) (Year: 2019).*

S. Kamp, M. Evertz, & M. Wien, "Decoder Side Motion Vector Derivation for Inter Frame Video Coding", 15 IEEE Int'l Conf. on Image Processing 1120-23 (Oct. 2008) (Year: 2008).*

S. Kamp & M. Wien, "Decoder-side Motion Vector Derivation for Block-Based Video Coding", 22 IEEE Transactions on Circuits & Sys. for Video Tech 1732-1745 (Dec. 2012) (Year: 2012).*

Bross et al., "Versatile Video Coding (Draft 3)", Document: JVET-L1001-v9, Joint Video Experts Team (JVET) of ITU-T SG 16 WP 3 and ISO/IEC JTC 1/SC 29/WG 11, 12th Meeting: Macao, CN, 3-12, pp. 1-233, Oct. 12, 2018.

Bross et al., "Versatile Video Coding (Draft 5)", Document: JVET-N1001-v8, Joint Video Experts Team (JVET) of ITU-T SG 16 WP 3 and ISO/IEC JTC 1/SC 29/WG 11, 14th Meeting: Gevenva, CH, pp. 1-397, Mar. 19-27, 2019.

Luo et al., "CE2-related: Prediction refinement with optical flow for affine mode", Document: JVET-N0236-r5, J Joint Video Experts Team (JVET) of ITU-T SG 16 WP 3 and ISO/IEC JTC 1/SC 29/WG 11, 14th Meeting: Geneva, CH, pp. 1-7, Mar. 19-27, 2019.

Bross et al., "Versatile Video Coding (Draft 5) ", Document: JVET-N1001-v5, Joint Video Experts Team (JVET) of ITU-T SG 16 WP 3 and ISO/IEC JTC 1/SC 29/WG 11, 14th Meeting: Geneva, CH, pp. 1-370, Mar. 19-27, 2019.

Chen J et al: "Algorithm description for Versatile Video Coding and Test Model 5 (VTM 5)", Document: JVET-N1002-v2 of ITU-T SG 16 WP 3 and ISO/IEC JTC 1/SC 29/WG 11, 14th Meeting: Geneva, CH, pp. 1-76, Mar. 19-27, 2019.

Anonymous, "High efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265, pp. 1-634. Apr. 2015.

Xiu et al, "CE4-related: Prediction sample padding unification for BDOF and PROF", Document: JVET-O0594, Joint Video Experts Team (JVET) of ITU-T SG 16 WP 3 and ISO/IEC JTC 1/SC 29/WG 11, 15th Meeting: Gothenburg, SE, pp. 1-4, Jul. 3-12, 2019.

Lee et al, "CE9-related; A simple gradient calculation at the CU boundaries for BDOF", Document: JVET-M0241, Joint Video Experts Team (JVET) of ITU-T SG 16 WP 3 and ISO/IEC JTC 1/SC 29/WG 11, 13th Meeting: Marrakech, MA, pp. 1-4, Jan. 9-18, 2019.

Galpin et al., "CE9-related: combination of PROF for affine and BDOF-BWA", JVET of ITU-T SG 16 WP3 and ISO/IEC JTC 1/SC 29/WG 11, 14th Meeting, document JVET-N0757, 2019, pp. 1-2.

Xiu (Kwai Inc.) et al: "CE4-related: Harmonization of BDOF and PROF", JVET of ITU-T SG 16 WP3 and ISO/IEC JTC 1/SC 29/WG 11, 15th Meeting, document JVET-00593, 2019, pp. 1-5.

Li (Panasonic Corporation) et al: "CE4-related: Alignment of BDOF refinement process with PROF", JVET of ITU-T SG 16 WP3 and ISO/IEC JTC 1/SC 29/WG 11, 15th Meeting, document JVET-00123-v3, 2019, pp. 1-3.

Galpin (Technicolor) et al: "CE9-related: BDOF-BWA unification", JVET of ITU-T SG 16 WP3 and ISO/IEC JTC 1/SC 29/WG 11, 14th Meeting, document JVET-N0239, 2019, pp. 1-3.

* cited by examiner

BI-PREDICTION REFINEMENT IN AFFINE WITH OPTICAL FLOW

This application claims the benefit, under 35 U.S.C. § 371 of International Application No. PCT/EP2020/067545, filed Jun. 23, 2020, which was published on Jan. 7, 2021, which claims the benefit of European Patent Application No. EP19305885.6 filed Jul. 1, 2019.

TECHNICAL FIELD

The present embodiments generally relate to a method and an apparatus for bi-direction refinement with optical flow in video encoding or decoding.

BACKGROUND

To achieve high compression efficiency, image and video coding schemes usually employ prediction and transform to leverage spatial and temporal redundancy in the video content. Generally, intra or inter prediction is used to exploit the intra or inter picture correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to an embodiment, a method of video encoding or decoding is provided, comprising: obtaining a first and second prediction block, from a first and second reference picture respectively, for a block to be encoded in a bi-prediction mode; obtaining a first extended region, which includes said first prediction block and a plurality of samples surrounding said first prediction block, wherein each of said plurality of samples surrounding said first prediction block is copied from an integer sample position closest to a corresponding fractional sample position in said first reference picture; obtaining a second extended region, which includes said second prediction block and a plurality of samples surrounding said second prediction block, wherein each of said plurality of samples surrounding said second prediction block is copied from an integer sample position closest to a corresponding fractional sample position in said second reference picture; obtaining spatial gradients for each sample in said first and second prediction blocks, responsive to said first and second extended regions respectively; obtaining motion refinement for samples in said block, based on said first and second prediction blocks and said spatial gradients; obtaining a prediction adjustment for said block, based on said motion refinement and said spatial gradients; and encoding or decoding said block responsive to said prediction adjustment, said first prediction block and said second prediction block.

According to another embodiment, a method for video encoding or decoding is provided, comprising: accessing a block to be encoded or decoded in affine mode, said block including a plurality of sub-blocks; for one sub-block of said plurality of sub-blocks, obtaining a first and second prediction block, from a first and second reference picture respectively, using sub-block based affine motion-compensated prediction, said one block in a bi-prediction mode; obtaining motion refinement for said one sub-block, based on said first and second prediction blocks and spatial gradients in said first and second prediction blocks, according to a temporal optical flow model and a spatial optical flow model; obtaining a prediction adjustment for said one sub-block, based on said motion refinement and said spatial gradients; and encoding or decoding said one sub-block responsive to said prediction adjustment, said first prediction block and said second prediction block.

According to another embodiment, an apparatus for video encoding or decoding is provided, comprising one or more processors, wherein said one or more processors are configured to: obtain a first and second prediction block, from a first and second reference picture respectively, for a block to be encoded in a bi-prediction mode; obtain a first extended region, which includes said first prediction block and a plurality of samples surrounding said first prediction block, wherein each of said plurality of samples surrounding said first prediction block is copied from an integer sample position closest to a corresponding fractional sample position in said first reference picture; obtain a second extended region, which includes said second prediction block and a plurality of samples surrounding said second prediction block, wherein each of said plurality of samples surrounding said second prediction block is copied from an integer sample position closest to a corresponding fractional sample position in said second reference picture; obtain spatial gradients for each sample in said first and second prediction blocks, responsive to said first and second extended regions respectively; obtain motion refinement for samples in said block, based on said first and second prediction blocks and said spatial gradients; obtain a prediction adjustment for said block, based on said motion refinement and said spatial gradients; and encode or decode said block responsive to said prediction adjustment, said first prediction block and said second prediction block.

According to another embodiment, an apparatus for video encoding or decoding is provided, comprising one or more processors, wherein said one or more processors are configured to: access a block to be encoded or decoded in affine mode, said block including a plurality of sub-blocks; for one sub-block of said plurality of sub-blocks, obtain a first and second prediction block, from a first and second reference picture respectively, using sub-block based affine motion-compensated prediction, said one block in a bi-prediction mode; obtain motion refinement for said one sub-block, based on said first and second prediction blocks and spatial gradients in said first and second prediction blocks, according to a temporal optical flow model and a spatial optical flow model; obtain a prediction adjustment for said one sub-block, based on said motion refinement and said spatial gradients; and encode or decode said one sub-block responsive to said prediction adjustment, said first prediction block and said second prediction block.

One or more embodiments also provide a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

DETAILED DESCRIPTION

Figure 1:
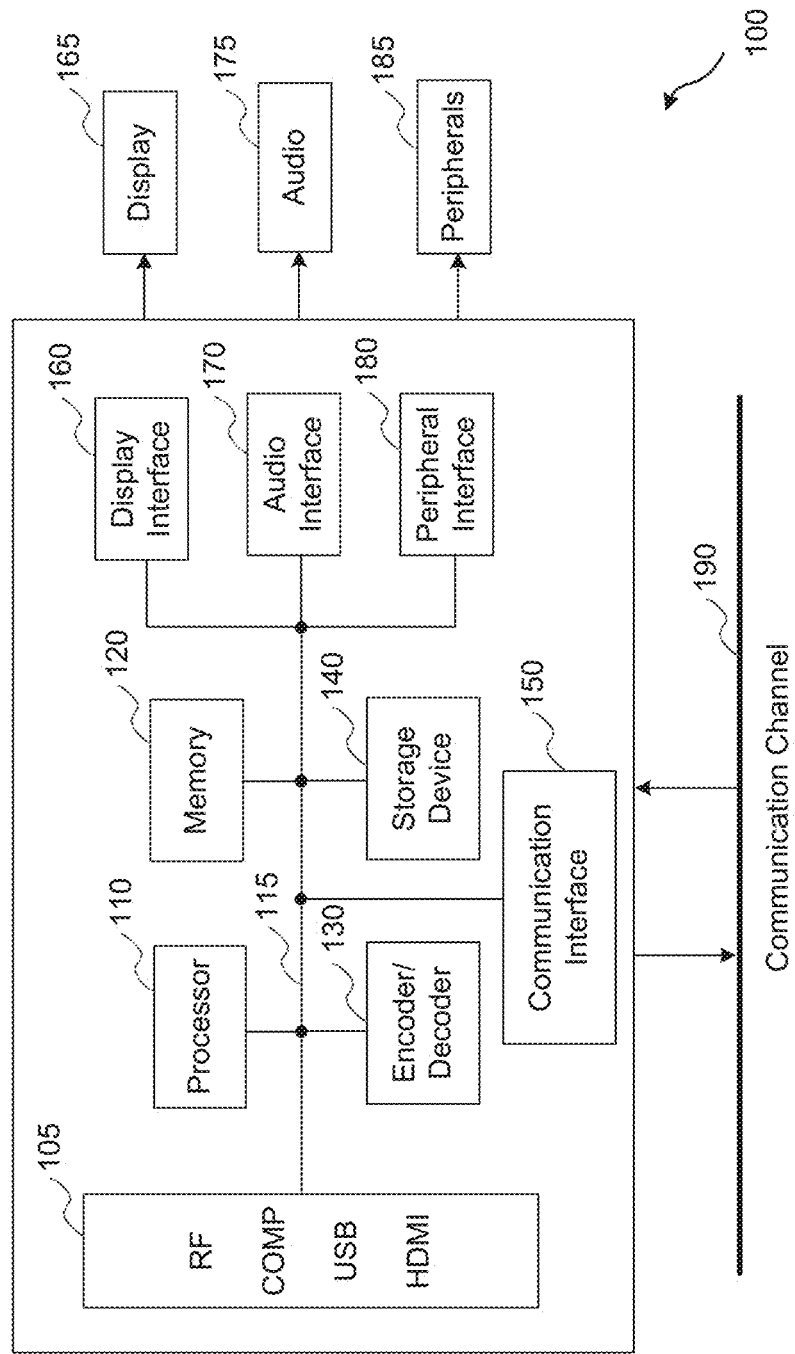
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing. Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Figure 2:
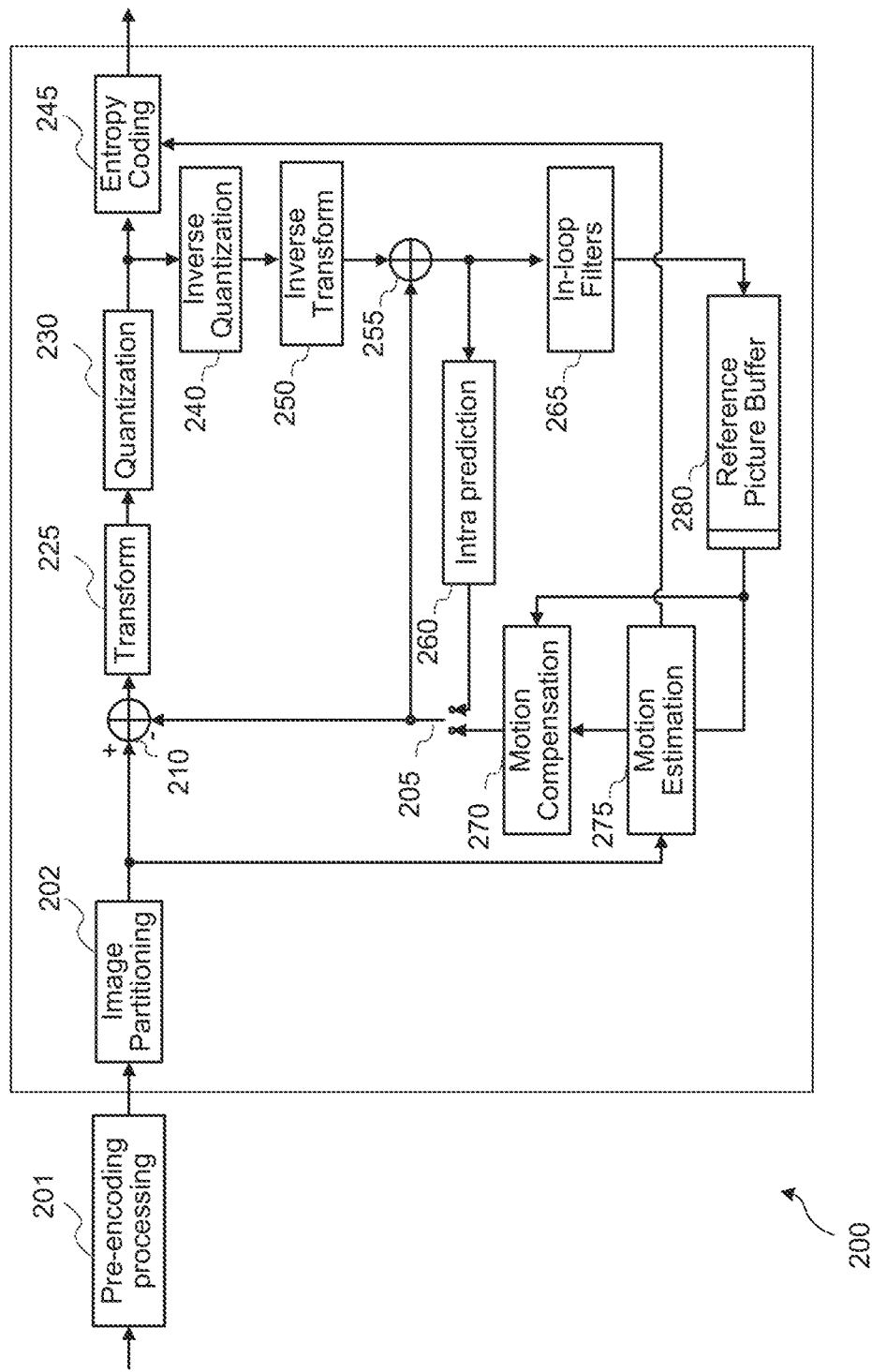
FIG. 2 illustrates a block diagram of an embodiment of a video encoder.

FIG. 2 illustrates an example video encoder 200, such as a High Efficiency Video Coding (HEVC) encoder. FIG. 2 may also illustrate an encoder in which improvements are made to the HEVC standard or an encoder employing technologies similar to HEVC, such as a VVC (Versatile Video Coding) encoder under development by JVET (Joint Video Exploration Team).

In the present application, the terms "reconstructed" and "decoded" may be used interchangeably, the terms "encoded" or "coded" may be used interchangeably, the terms "pixel" or "sample" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 200, a picture is encoded by the encoder elements as described below. The picture to be encoded is partitioned (202) and processed in units of, for example, CUs. Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

Figure 3:
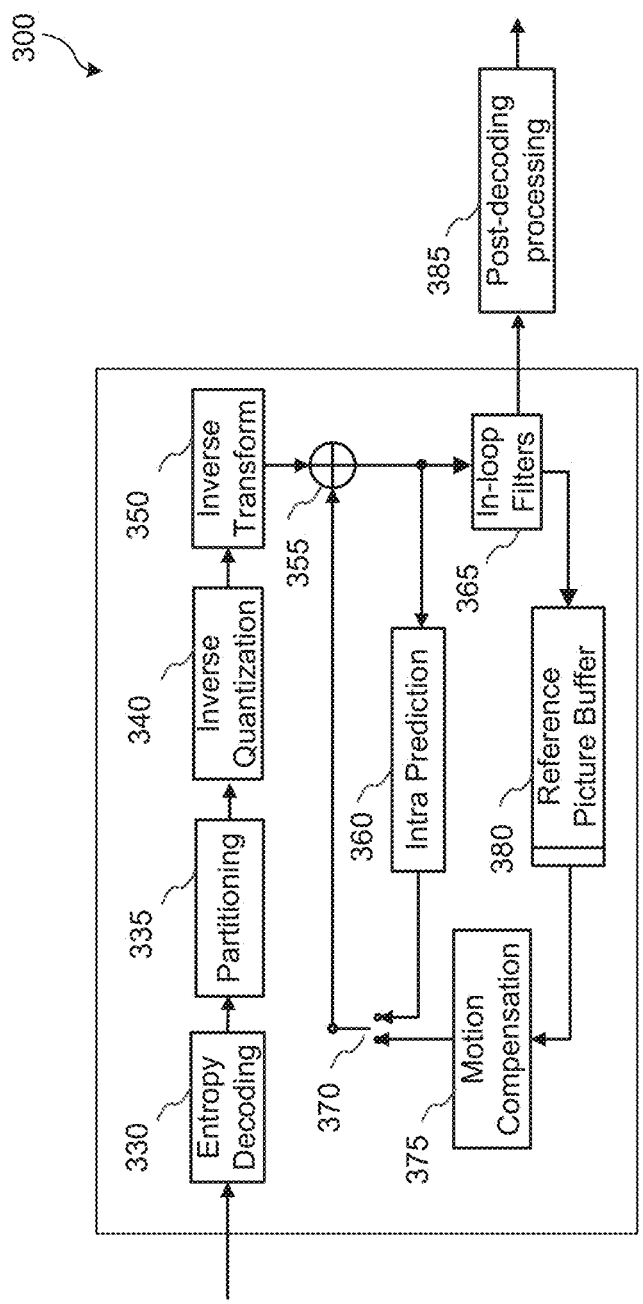
FIG. 3 illustrates a block diagram of an embodiment of a video decoder.
Figure 4:
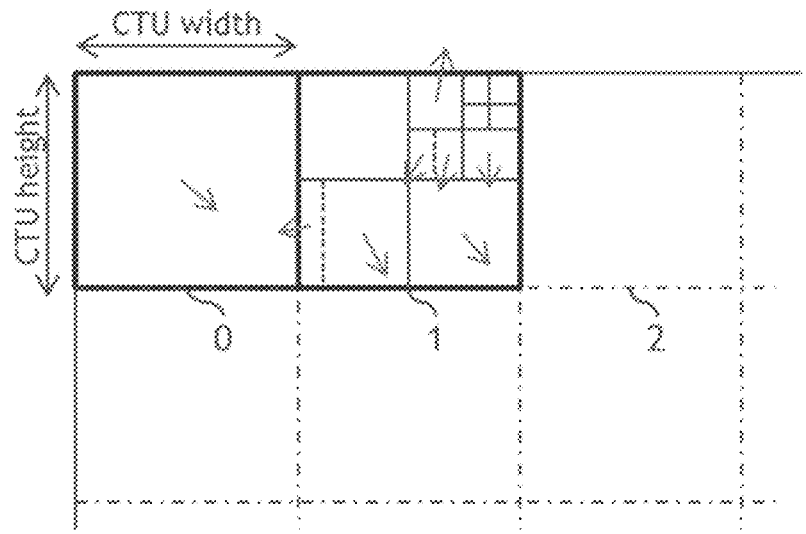
FIG. 4 illustrates Coding Tree Unit and Coding Tree concepts to represent a compressed picture.

FIG. 3 illustrates a block diagram of an example video decoder 300. In the decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which can be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block can be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream.

Affine Mode

In HEVC, only the translational motion model is applied for motion-compensated prediction. To consider other types of motion, e.g., zoom in/out, rotation, perspective motions and other irregular motions, an affine motion-compensated prediction is applied in the VTM-3.0. The affine motion model in VVC is either 4-parameter or 6-parameter.

Figure 5:
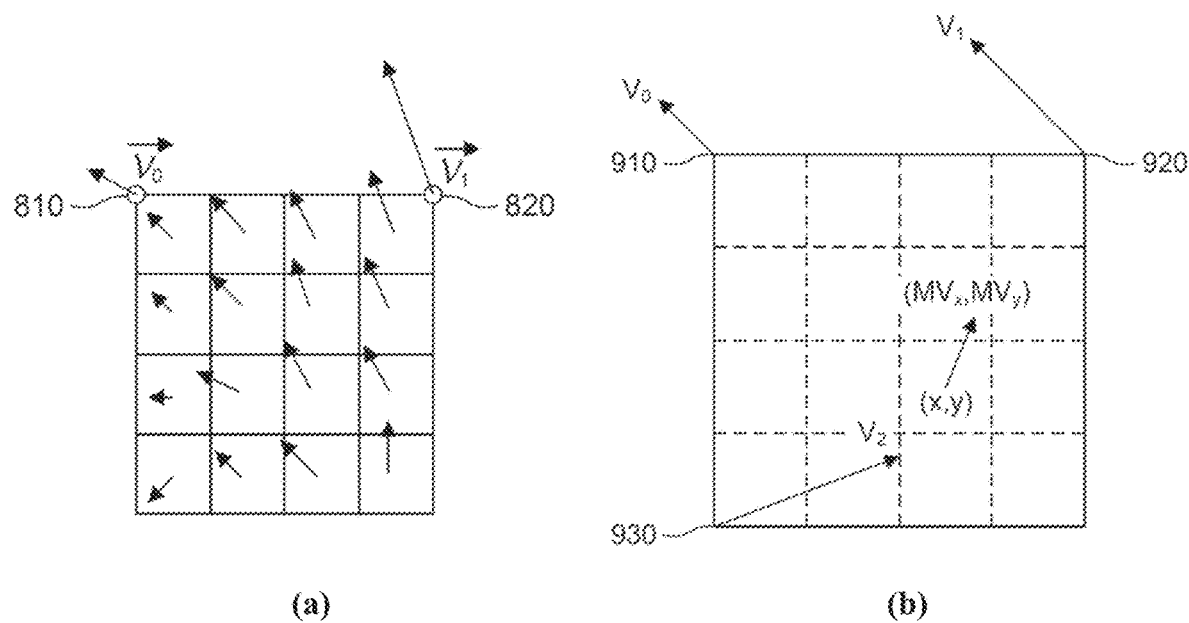
FIG. 5 illustrates the affine motion model used in VVC (Versatile Video Coding).

The four-parameter affine motion model has the following parameters: two parameters for translation movement in horizontal and vertical directions, one parameter for zoom motion for both directions, and one parameter for rotation motion for both directions. Horizontal zoom parameter is equal to vertical zoom parameter. Horizontal rotation parameter is equal to vertical rotation parameter. The four-parameter affine motion model is coded in VTM using two motion vectors at two control point positions defined at top-left corner (810) and top-right corner (820) of current CU. As shown in FIG. 5, the affine motion field of the block is described by two control point motion vectors ($V_0$, $V_1$). Based on the control point motion, the motion field ($v_x$, $v_y$) of one affine coded block is described as $$v_x = \frac{(v_{1x} - v_{0x})}{w}x - \frac{(v_{1y} - v_{0y})}{w}y + v_{0x} \quad \text{Equation 1}$$

$$v_y = \frac{(v_{1y} - v_{0y})}{w}x + \frac{(v_{1x} - v_{0x})}{w}y + v_{0y}.$$

where ($v_{0x}$, $v_{0y}$) is motion vector of the top-left corner control point (810), and ($v_{1x}$, $v_{1y}$) is motion vector of the top-right corner control point (820), and w is the width of CU. In VTM-3.0, the motion field of an affine coded CU is derived at the 4×4 block level, that is, ($v_x$, $v_y$) is derived for each of the 4×4 blocks within the current CU and applied to the corresponding 4×4 block.

The 6-parameter affine motion model has the following parameters: two parameters for translation movement in horizontal and vertical directions, one parameter for zoom motion and one parameter for rotation motion in horizontal direction, and one parameter for zoom motion and one parameter for rotation motion in vertical direction. The 6-parameter affine motion model is coded with three MVs at three control points. As shown in FIG. 5, three control points for a 6-parameter affine coded CU are defined at top-left, top-right and bottom left corners (910, 920, 930) of a CU. The motion at top-left control point (910) is related to translation motion, and the motion at top-right control point (920) is related to rotation and zoom motion in horizontal direction, and the motion at bottom-left control point (930) is related to rotation and zoom motion in vertical direction. For the 6-parameter affine motion model, the rotation and zoom motion in the horizontal direction may not be same as those motion in the vertical direction. The motion vector of each sub-block ($v_x$, $v_y$) is derived using three MVs at control points as:

$$v_x = v_{0x} + (v_{1x} - v_{0x}) * \frac{x}{w} + (v_{2x} - v_{0x}) * \frac{y}{h} \quad \text{Equation 2}$$

$$v_y = v_{0y} + (v_{1y} - v_{0y}) * \frac{x}{w} + (v_{2y} - v_{0y}) * \frac{y}{h}.$$

where ($v_{2x}$, $v_{2y}$) is the motion vector of the bottom-left control point (930), (x, y) is the center position of the sub-block, w and h are the width and height of the CU.

Temporal Optical Flow

Bi-Directional Optical Flow (BDOF)

Conventional bi-prediction in video coding is a simple combination of two temporal prediction blocks obtained from the reference pictures that are already reconstructed. However, due to the limitation of the block-based motion compensation (MC), there could be remaining small motion that can be observed between the samples of two prediction blocks, thus reducing the efficiency of motion-compensated prediction. To solve this problem, the bi-directional optical flow (BDOF) tool is included in VTM 3.0 (VVC Test Model 3.0, see B. Bross, J. Chen, S. Liu, "Versatile Video Coding (Draft 3)," 12th Meeting: Macao, CN, JVET-L1001, 3-12 Oct. 2018) to reduce the impact of such motion for every sample inside one block. BDOF, previously referred to as BIO, is used to refine the bi-prediction signal of a CU at the 4×4 sub-block level. The BDOF mode is based on the optical flow concept, which assumes that the motion of an object is smooth and its luminance is constant along the considered time interval. BDOF is sample-wise motion refinement, which is performed on top of block-wise motion compensation for bi-prediction. The sample-level motion refinement does not use signaling. In case of bi-prediction, the goal of BDOF is to refine motion for each sample assuming linear displacement in-between the two reference pictures and based on Hermite's interpolation of the optical flow as shown in FIG. 6.

In VTM-3.0, BDOF is only applied to the luma component. BDOF is applied to a CU if the CU satisfies the following conditions:
- the CU's height is not 4, and the CU is not in size of 4×8.
- the CU is not coded using affine mode or the ATMVP (Alternative Temporal Motion Vector Prediction) merge mode.
- the CU is coded using "true" bi-prediction mode, i.e., one of the two reference pictures is prior to the current picture in display order and the other is after the current picture in display order.

Specifically, in the current BDOF design, the derivation of the refined motion vector for each sample in one block is based on the classical optical flow model, which describes the relation of motion velocity and the luminance change in spatial and temporal domain. Let $I^{(k)}(x, y)$ be the sample value at the coordinate $(x, y)$ of the prediction block derived from the reference picture list k (k=0, 1), and $\partial I^{(k)}(x, y)/\partial x$ and $\partial I^{(k)}(x, y)/\partial y$ are the horizontal and vertical gradients of the sample. Given the optical flow model, the motion refinement $(v_x, v_y)$ at $(x, y)$ can be derived by $$\frac{\partial I^{(k)}(x, y)}{\partial t} + v_x \cdot \frac{\partial I^{(k)}(x, y)}{\partial x} + v_y \cdot \frac{\partial I^{(k)}(x, y)}{\partial y} = 0. \quad \text{Equation 3}$$

Figure 6:
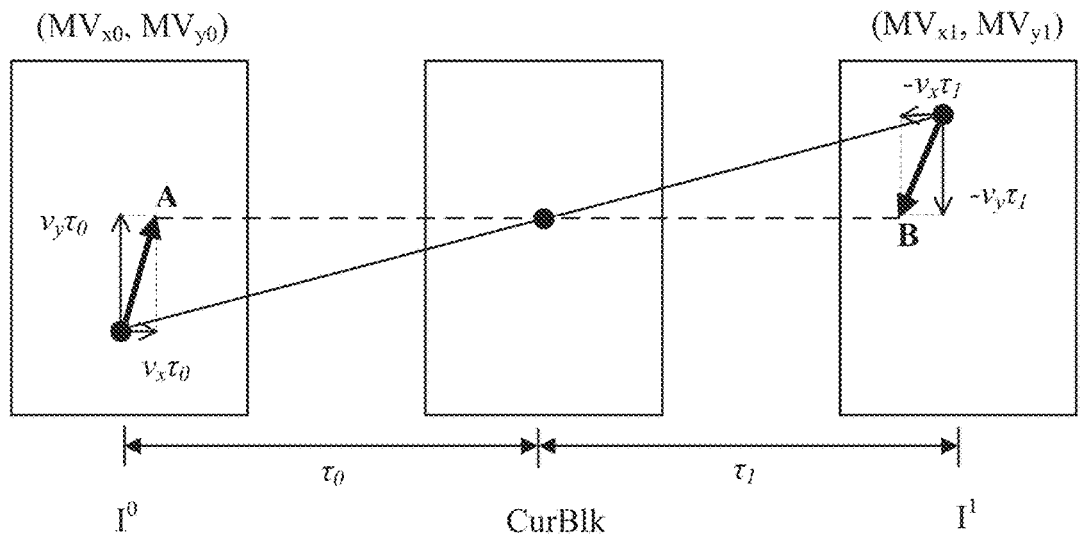
FIG. 6 illustrates an example of an optical flow trajectory.

In FIG. 6, suppose there are a backward reference at temporal distance $\tau_0$ and a forward reference at temporal distance $\tau_1$ to the current picture, $(MV_{x0}, MV_{y0})$ and $(MV_{x1}, MV_{y1})$ indicate the block-level motion vectors that are used to generate the two prediction blocks $I^{(0)}$ and $I^{(1)}$ in the two reference pictures, respectively. Based on the optical flow model, for predicting the current block $I_B$ in the current picture, we have (assuming $\tau_0 = \tau_1 = 1$):

$$I_B(x, y) = I_0(x, y) - v_x \cdot \frac{\partial I^{(0)}(x, y)}{\partial x} - v_y \cdot \frac{\partial I^{(0)}(x, y)}{\partial y} \quad \text{(Equation 4)}$$

$$I_B(x, y) = I_1(x, y) + v_x \cdot \frac{\partial I^{(1)}(x, y)}{\partial x} + v_y \cdot \frac{\partial I^{(1)}(x, y)}{\partial y}$$

$$I_B(x, y) = \frac{I_0(x, y) + I_1(x, y)}{2} + \frac{v_x \cdot \left(\frac{\partial I^{(1)}(x, y)}{\partial x} - \frac{\partial I^{(0)}(x, y)}{\partial x}\right) + v_y \cdot \left(\frac{\partial I^{(1)}(x, y)}{\partial y} - \frac{\partial I^{(0)}(x, y)}{\partial y}\right)}{2}.$$

where $$\frac{I_0(x, y) + I_1(x, y)}{2}$$

is the regular bi-prediction, and the remaining offset is the BDOF adjustment which is calculated based on the motion refinement and the gradients.

Further, the motion refinement $(v_x, v_y)$ at the sample location $(x, y)$ is calculated by minimizing the difference $\Delta$ between the values of the samples after motion refinement compensation (i.e., A and B in FIG. 6), as shown as:

$$\Delta(x, y) = I^{(1)}(x, y) - I^{(0)}(x, y) + v_x \left(\frac{\partial I^{(1)}(x, y)}{\partial x} + \frac{\partial I^{(0)}(x, y)}{\partial x}\right) + v_y \left(\frac{\partial I^{(1)}(x, y)}{\partial y} + \frac{\partial I^{(0)}(x, y)}{\partial y}\right). \quad \text{Equation 5.}$$

To ensure the regularity of the derived motion refinement, it is assumed that the motion refinement is consistent for the samples inside one 4×4 sub-block. For each 4×4 sub-block, a motion refinement $(v_{xB}, v_{yB})$ is calculated by minimizing the difference between the L0 and L1 prediction samples. The motion refinement is then used to adjust the bi-predicted sample values in the 4×4 sub-block. The following steps are applied in the BDOF process.

First, the horizontal and vertical gradients, $$\frac{\partial I^{(k)}}{\partial x}(i, j) \text{ and } \frac{\partial I^{(k)}}{\partial y}(i, j),$$

k=0,1, of the two prediction signals are computed by directly calculating the difference between two neighboring samples, i.e., Equation 6

The horizontal and vertical gradients of the two prediction signals $$\frac{\partial I^{(k)}}{\partial x}(i, j) = \left(I^{(k)}(i+1, j) - I^{(k)}(i-1, j)\right) \gg 4$$

$$\frac{\partial I^{(k)}}{\partial y}(i, j) = \left(I^{(k)}(i, j+1) - I^{(k)}(i, j-1)\right) \gg 4.$$

where $I^{(k)}(i,j)$ are the sample value at coordinate $(i,j)$ of the prediction signal in list k, k=0,1.

Then, the auto- and cross-correlation of the gradients, $S_1$, $S_2$, $S_3$, $S_5$ and $S_6$, are calculated as $$S_1 = \Sigma_{(i,j) \in \Omega} \psi_x(i,j) \cdot \psi_x(i,j), S_3 = \Sigma_{(i,j) \in \Omega} \theta(i,j) \cdot \psi_x(i,j)$$

$$S_2 = \Sigma_{(i,j) \in \Omega} \psi_x(i,j) \cdot \psi_y(i,j)$$

$$S_5 = \Sigma_{(i,j) \in \Omega} \psi_y(i,j) \cdot \psi_y(i,j) S_6 = \Sigma_{(i,j) \in \Omega} \theta(i,j) \cdot \psi_y(i,j)$$

Equation 7: The Auto- and Cross-Correlation of the Gradients.

where $\Omega$ is a 6×6 window surrounding the 4×4 sub-block, and $$\psi_x(i, j) = \left(\frac{\partial I^{(1)}}{\partial x}(i, j) + \frac{\partial I^{(0)}}{\partial x}(i, j)\right) \gg n_a$$

$$\psi_y(i, j) = \left(\frac{\partial I^{(1)}}{\partial y}(i, j) + \frac{\partial I^{(0)}}{\partial y}(i, j)\right) \gg n_a$$

$$\theta(i, j) = \left(I^{(1)}(i, j) \gg n_b\right) - \left(I^{(0)}(i, j) \gg n_b\right)$$

The motion refinement $(v_{xB}, v_{yB})$ is then derived using the cross- and auto-correlation terms using the following:

$$v_{xB} = S_1 > 0 ? \text{clip3}(-\text{th}'_{BIO}, \text{th}'_{BIO}, -((S_3 \cdot 2^{n_b - n_a}) \gg \lfloor \log_2 S_1 \rfloor)) : 0$$

$$v_{yB} = S_5 > 0 ? \text{clip3}((-\text{th}'_{BIO}, \text{th}'_{BIO}, -((S_6 \cdot 2^{n_b - n_a} - ((v_x S_{2,m}) \ll n_{S_2} + v_x S_{2,s})/2)) \gg \lfloor \log_2 S_5 \rfloor)) : 0$$

Equation 8: Derive the Motion Vector Refinement ($v_{xB}$, $v_{yB}$). where $$S_{2,m} = S_2 \gg n_{S_2}, S_{2,s} = S_2 \,\&\, (2^{n_{S_2}} - 1), th'_{BIO} = 2^{13-BD},$$

and $\lfloor \cdot \rfloor$ is the floor function.

Based on the motion refinement and the gradients, the following adjustment is calculated for each sample in the 4×4 sub-block:

$$\Delta I_B(x, y) = rnd\left(\left(v_{xB}\left(\frac{\partial I^{(1)}(x, y)}{\partial x} - \frac{\partial I^{(0)}(x, y)}{\partial x}\right)\right)/2\right) + rnd\left(\left(v_{yB}\left(\frac{\partial I^{(1)}(x, y)}{\partial y} - \frac{\partial I^{(0)}(x, y)}{\partial y}\right)\right)/2\right)$$

where rnd( ) is the rounding function to return the integral value that is nearest to the argument.

Equation 9: Adjustment with BDOF for Each Sample in the 4×4 Sub-Block.

Finally, the BDOF samples of the CU are calculated by adjusting the bi-prediction samples as follows:

$$I_B(x,y)=(I_0(x,y)+I_1(x,y)+\Delta I_B(x,y)+o_{offset}) \gg shift$$

where $o_{offset}$ and shift are used to normalize the final predictor to input bitdepth.

Equation 10: Adjust the Bi-Prediction Samples with BDOF.

In the above, the values of $n_a$, $n_b$ and $n_{S_2}$ are equal to 3, 6, and 12, respectively. These values are selected such that the multipliers in the BDOF process do not exceed 15-bit, and the maximum bit-width of the intermediate parameters in the BDOF process is kept within 32-bit.

Figure 7:
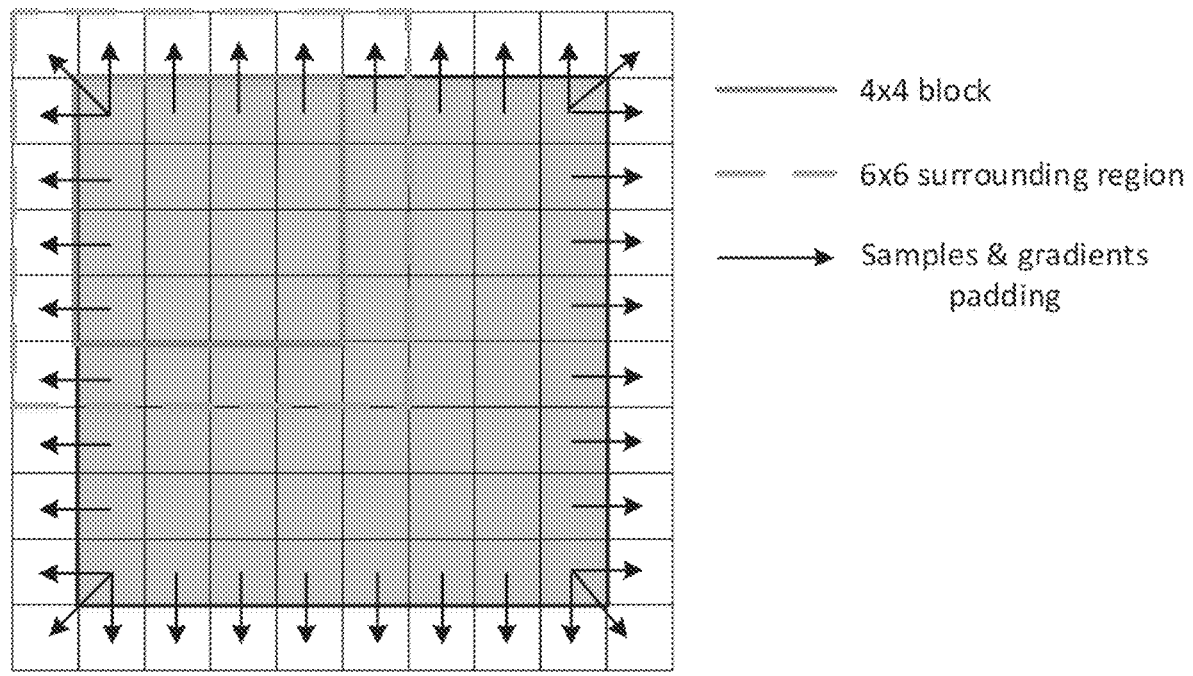
FIG. 7 illustrates the extended CU region used in BDOF (Bi-directional Optical Flow) in VTM (VVC Test Model) 3.0.

In order to derive the gradient values, some prediction samples $I^{(k)}(i,j)$ in list k (k=0,1) outside of the current CU boundaries need to be generated. As depicted in FIG. 7, BDOF in VTM-3.0 uses one extended row/column around the CU's boundaries. In order to control the computational complexity of generating the out-of-boundary prediction samples, a bilinear filter is used to generate prediction samples in the extended area (white positions), and the normal 8-tap motion compensation interpolation filter is used to generate prediction samples within the CU (gray positions). These extended sample values are used in gradient calculation only. For the remaining steps in the BDOF process, if any sample and gradient values outside of the CU boundaries are needed, they are padded (i.e., repeated) from their nearest neighbors.

Spatial Optical Flow

Prediction Refinement with Optical Flow (PROF)

Affine motion model parameters can be used to derive the motion vector of each pixel in a CU. While the complexity of generating pixel-based affine motion-compensated prediction is very high because memory access bandwidth requirement for this kind of sample-based MC is high, the current VVC adopted a sub-block based affine motion compensation method, where a CU is divided into 4×4 sub-blocks, each of which is assigned with a MV which is derived from the affine model parameters. The MV is a MV at the center of the sub-block. All pixels in the sub-block share the same sub-block MV. Sub-block based affine motion compensation is a tradeoff between coding efficiency and complexity.

In JVET-N0236 (see J. Luo, Y. He, "CE2-related: Prediction refinement with optical flow for affine mode", 14th Meeting: Geneva, CH, JVET-N0236, 19-27 Mar. 2019), an optical flow based motion refinement has been proposed to correct the block-based affine motion compensation. In particular, to achieve a finer granularity of motion compensation, JVET-N0236 proposes a method to refine the sub-block-based affine motion-compensated prediction with optical flow, which uses the small motion difference between the sample-wise affine motion and the sub-block affine motion to derive the luminance refinement. After the sub-block-based affine motion compensation is performed, luma prediction sample is refined by adding a difference derived by the optical flow equation. PROF is described in the following four steps.

Step 1) The sub-block-based affine motion compensation is performed to generate sub-block prediction I(i, j).

Step 2) The spatial gradients $$\frac{\partial I}{\partial x}(i, j) \text{ and } \frac{\partial I}{\partial y}(i, j)$$

of the sub-block prediction are calculated at each sample location using a 3-tap filter [−1, 0, 1].

Equation 11

The horizontal and vertical gradients of the sub-block prediction signal $$\frac{\partial I}{\partial x}(i, j) = I(i + 1, j) - I(i - 1, j)$$

$$\frac{\partial I}{\partial y}(i, j) = I(i, j + 1) - I(i, j - 1).$$

The sub-block prediction is extended by one pixel on each side for the gradient calculation. To reduce the memory bandwidth and complexity, the pixels on the extended borders are copied from the nearest integer pixel position in the reference picture. Therefore, additional interpolation for a padding region is avoided.

Step 3) The luma prediction refinement is calculated by the optical flow equation.

Equation 12

Figure 8:
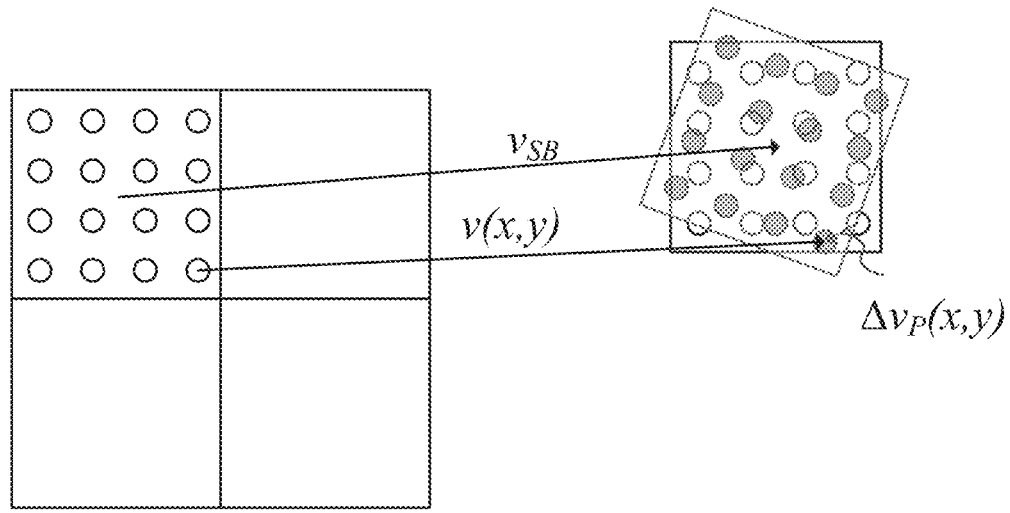
FIG. 8 illustrates the difference between a sub-block MV $v_{SB}$ and a pixel MV $v(x,y)$, $\Delta v_P (x, y)$.

Adjustment with PROF for each sample in the 4×4 sunb-block $$\Delta I_P(x, y) = \frac{\partial I}{\partial x}(x, y) * \Delta v_{xP}(x, y) + \frac{\partial I}{\partial y}(x, y) * \Delta v_{yP}(x, y).$$

where the $\Delta v_P$ (x, y) is the difference between pixel MV computed for sample location (x, y), denoted by v(x, y), and the sub-block MV ($v_{SB}$) of the sub-block to which pixel (x, y) belongs, as shown in FIG. 8.

Since the affine model parameters and the pixel location relative to the sub-block center do not change from sub-block to sub-block, $\Delta v_P$ (x, y) can be calculated for the first sub-block, and reused for other sub-blocks in the same CU. Let x and y be the horizontal and vertical offset from the pixel location to the center of the sub-block, $\Delta v_P$ (x, y) can be derived by the following equation:

Equation 13

Derive the motion vector refinement $(\Delta v_{xP}, \Delta v_{yP})$ $$\begin{cases} \Delta v_{xP}(x, y) = c*x + d*y \\ \Delta v_{yP}(x, y) = e*x + f*y \end{cases}$$

For a 4-parameter affine model, $$\begin{cases} c = f = \dfrac{v_{1x} - v_{0x}}{w} \\ e = -d = \dfrac{v_{1y} - v_{0y}}{w} \end{cases}$$

For a 6-parameter affine model, $$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement is added to the sub-block prediction I(i, j). The final prediction $I_P(x, y)$ is generated as the following equation:

$$I_P(x,y) = I(x,y) + \Delta I_P(x,y).$$

In one embodiment, the present application proposes to apply BDOF for the motion compensation of a bi-direction affine coded CU by using the same spatial gradients derivation rule as PROF. The present application also proposes to combine these two optical flow based motion refinements, PROF and BDOF, to correct the block-based affine motion compensation. In case that the calculation of the spatial gradients $$\frac{\partial I}{\partial x}(i,j) \text{ and } \frac{\partial I}{\partial y}(i,j)$$

is performed for both PROF and BDOF, some simplifications of the prediction refinement derivation process might be achieved. A general bi-prediction refinement in affine mode with optical flow is also proposed.

Activate BDOF for Affine and Modify the Derivation of Spatial Gradients

As mentioned above, for BDOF in VTM-3.0, the sub-block prediction is extended by one pixel each side for the spatial gradient calculation of the prediction signals. Therefore, an extended sub-block (a 6×6 window including the 4×4 sub-block and the padding samples) is used as depicted in FIG. 7. Because only one single motion vector is applied for a non-affine CU in each reference picture list, the generation of the padding region (i.e., extended borders) can be performed once for the prediction block corresponding to the whole CU. Therefore, the BDOF uses one extended row/column around the CU's boundaries. These out-of-boundary prediction samples are generated by the bilinear filter.

If different MVs are applied for each 4×4 sub-block, then the generation of the padding region should be performed for each sub-block prediction separately. Several computations of deriving the out-of-boundary prediction and the corresponding memory storages are needed, which is not good for controlling the computational complexity. Thus, in VTM-3.0, BDOF is not applied to a CU coded using the affine mode.

To reduce the memory bandwidth and complexity, when PROF generates the padding region, the pixels on the extended borders are copied from the nearest integer pixel position in the reference picture. Therefore, additional interpolation for the padding region is avoided.

Figure 9:
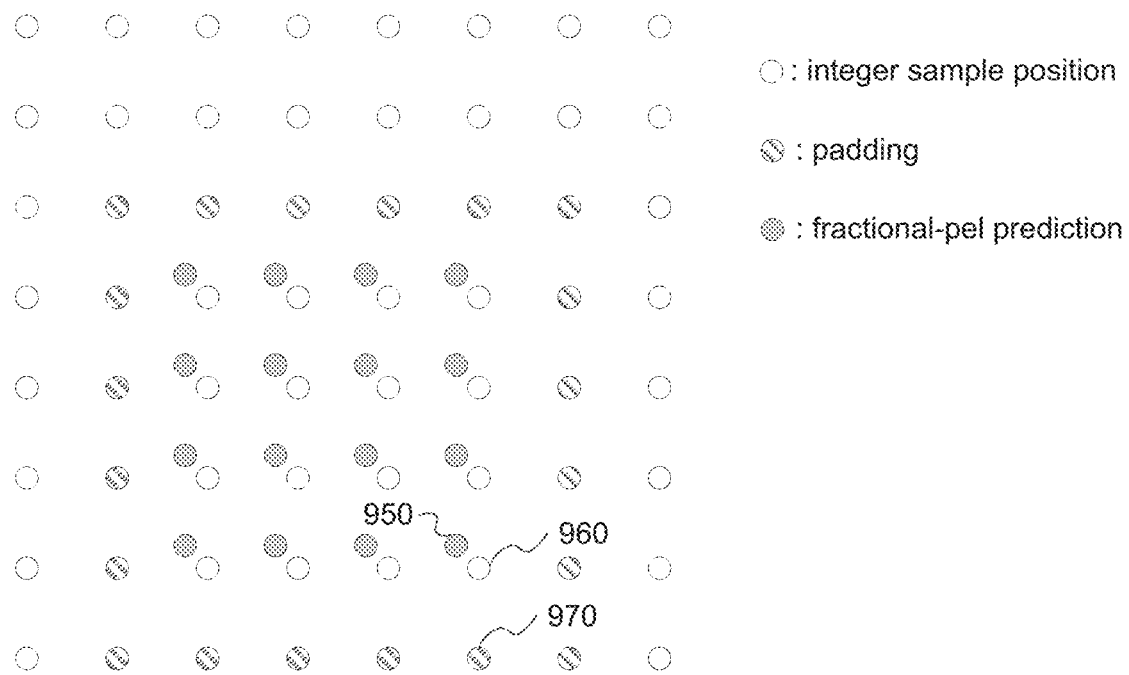
FIG. 9 illustrates the nearest integer padding used in PROF.

In one embodiment, the present application proposes to apply BDOF for the motion compensation of an affine coded CU, and to derive the spatial gradients of the prediction signals with the same padding region generation rule as PROF, which uses the nearest integer pixels as shown in FIG. 9. When padding a block of prediction signals with prediction samples at integer sample positions, each sample in the padding region is generated by copying the nearest integer sample in the prediction block. When the prediction signals are at fractional sample positions, a new block with integer sample positions is used where each integer sample position in the new block is closest to a corresponding sample in the prediction block. As shown in FIG. 9, the integer samples (960) used to generate extended prediction samples (970) are closest to the fractional-sample positions (950).

Mathematically, let x and y be the corresponding horizontal and vertical sample positions in the reference picture in 1/16-sample unit, which are represented at $1 << \text{Bits}_{Frac}$ ($\text{Bits}_{Frac}=4$) accuracy, the nearest integer sample positions $x_{int}$ and $y_{int}$ for padding region can be derived by the following equation:

$$x_{int} = (x >> \text{Bits}_{Frac}) + ((x \& 15) >> (\text{Bits}_{Frac}-1)) - 1$$

$$x_{int} = \text{Clip3}(0, \text{pic}W-1, x_{int})$$

$$y_{int} = (y >> \text{Bits}_{Frac}) + ((y \& 15) >> (\text{Bits}_{Frac}-1)) - 1$$

$$y_{int} = \text{Clip3}(0, \text{pic}H-1, y_{int})$$

Equation 14: Derive the Nearest Integer Sample Position for Padding.
where the value of $\text{Bits}_{Frac}$ equals to 4, picW and picH indicates the width and height of the reference picture, respectively.

Apply BDOF for Motion Compensation of a Bi-Direction Affine Coded CU After PROF

Figure 10:
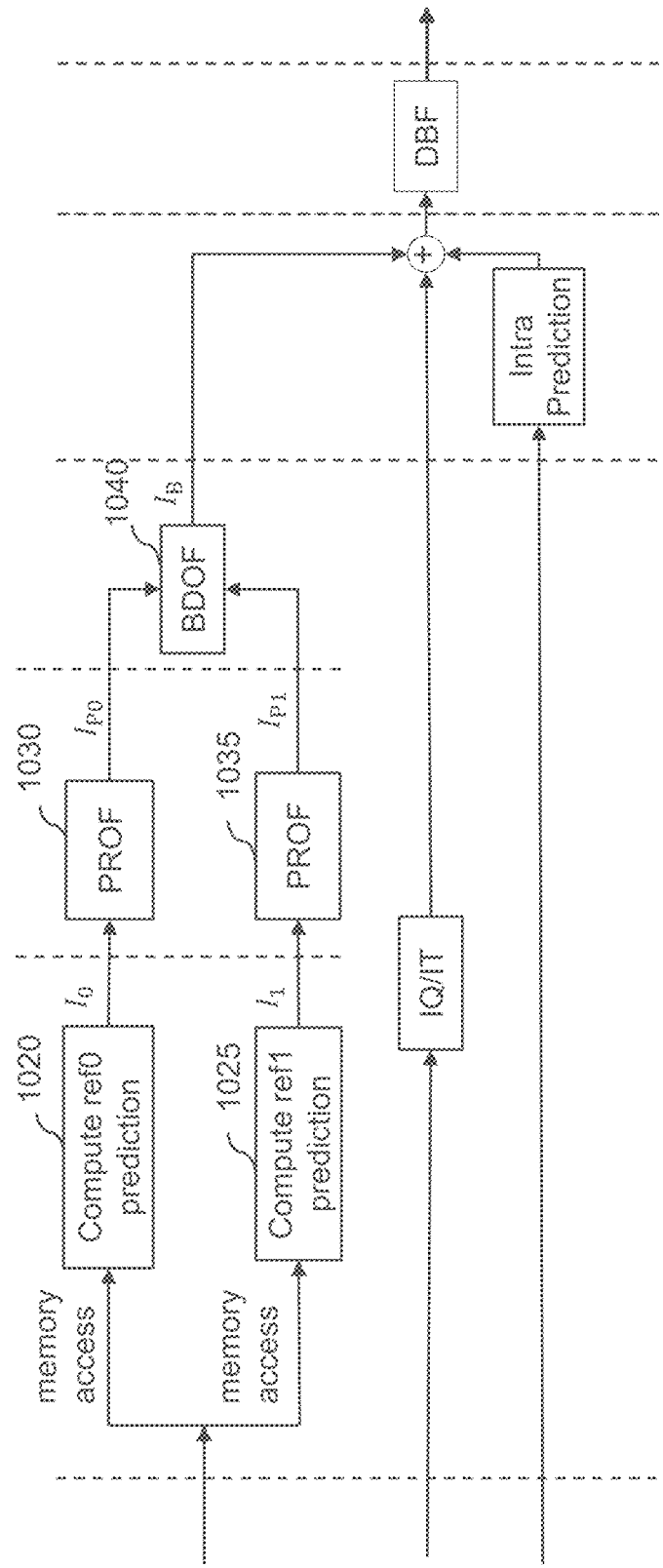
FIG. 10 illustrates a method where BDOF is applied for motion compensation of a bi-direction affine coded CU (Coding Unit) after PROF (Prediction Refinement with Optical Flow), according to an embodiment.

In this embodiment, BDOF is applied for the motion compensation of a bi-direction affine coded CU after performing PROF. As shown in FIG. 10, for a bi-prediction CU, the prediction signals can be computed (1020, 1025) for both reference picture lists. After PROF (1030, 1035) is performed for a CU with affine mode, BDOF can be applied (1040) for this affine coded CU after PROF to further refine the prediction signals.

In particular, for a CU using bi-prediction signals, PROF is applied (1030, 1035) to refine the sub-block based affine motion-compensated prediction signals $I_0$ from reference 0 (1020) and $I_1$ from reference 1 (1025). The process of PROF is the same as before without extra modification. The luma prediction refinements $\Delta I_{P0}$ and $\Delta I_{P1}$ of $I_0$ and $I_1$ are calculated by the optical flow equation with their corresponding horizontal and vertical spatial gradients $$\frac{\partial I_0}{\partial x}, \frac{\partial I_0}{\partial y}, \frac{\partial I_1}{\partial x} \text{ and } \frac{\partial I_1}{\partial y},$$

and the MV difference between the pixel MV and the sub-block MV derived by the affine model.

Equation 15

Prediction refinements with PROF for each reference list $$\Delta I_{P0}(x, y) = \frac{\partial I_0}{\partial x}(x, y) * \Delta v_{xP0}(x, y) + \frac{\partial I_0}{\partial y}(x, y) * \Delta v_{yP0}(x, y)$$

$$\Delta I_{P1}(x, y) = \frac{\partial I_1}{\partial x}(x, y) * \Delta v_{xP1}(x, y) + \frac{\partial I_1}{\partial y}(x, y) * \Delta v_{yP1}(x, y).$$

The corrected luma prediction signals with PROF, $I_{P0}$ and $I_{P1}$, are generated by adding the prediction refinements $\Delta I_{P0}$ and $\Delta I_{P1}$ to the prediction signals separately:

$$I_{P0}(x,y) = I_0(x,y) + \Delta I_{P0}(x,y)$$

$$I_{P1}(x,y) = I_1(x,y) + \Delta I_{P1}(x,y)$$

Equation 16: Adjust the Prediction Samples with PROF for Each Reference List.

After obtaining the corrected prediction signals from the two reference picture lists, the BDOF process is performed (1040) on $I_{P0}$ and $I_{P1}$.

In one example, the classical BDOF as mentioned before is applied. To be noted, the input prediction signals are not the original prediction signals $I_0$ and $I_1$, but the corrected prediction signals with PROF $I_{P0}$ and $I_{P1}$. Therefore, the corresponding horizontal and vertical spatial gradients are $$\frac{\partial I_{P0}}{\partial x}, \frac{\partial I_{P0}}{\partial y}, \frac{\partial I_{P1}}{\partial x} \text{ and } \frac{\partial I_{P1}}{\partial y}.$$

Based on the motion refinement and the spatial gradients, the prediction refinement with BDOF $\Delta I_B$ can be roughly represented by:

Equation 17

Prediction refinement with BDOF after PROF $$\Delta I_B(x, y) = \frac{\left(\frac{\partial I_{P1}}{\partial x}(x, y) - \frac{\partial I_{P0}}{\partial x}(x, y)\right) * \Delta v_{xB}(x, y) + \left(\frac{\partial I_{P1}}{\partial y}(x, y) - \frac{\partial I_{P0}}{\partial y}(x, y)\right) * \Delta v_{yB}(x, y)}{2}$$

In this case, the final prediction $I_B$ is generated as the following:

Equation 18

Adjust the bi-prediction samples with BDOF after PROF $$I_B(x, y) = \frac{I_{P0}(x, y) + I_{P1}(x, y)}{2} + \Delta I_B(x, y)$$

In another example, the original prediction signals $I_0$ and $I_1$ are used to derive the related spatial gradients and motion refinement for BDOF. The advantage is that the spatial gradients $$\frac{\partial I_0}{\partial x}, \frac{\partial I_0}{\partial y}, \frac{\partial I_1}{\partial x} \text{ and } \frac{\partial I_1}{\partial y}$$

have already been generated by PROF, and can be re-used for BDOF without adding extra complexity of calculation and memory storage.

Simplification of the Prediction Refinement when Combining PROF and BDOF

In the above example, if PROF has already been performed for a CU with the affine mode, then the spatial gradients $$\frac{\partial I_0}{\partial x}, \frac{\partial I_0}{\partial y}, \frac{\partial I_1}{\partial x} \text{ and } \frac{\partial I_1}{\partial y}$$

of the prediction signals can be re-used directly for the subsequent BDOF process. Hence, there are some overlapping calculations to derive the prediction refinements and the final corrected prediction signals when PROF and BDOF are combined. In one embodiment, some further simplifications of the prediction derivation process are proposed.

As proposed in one above example, the spatial gradients $$\frac{\partial I_0}{\partial x}, \frac{\partial I_0}{\partial y}, \frac{\partial I_1}{\partial x} \text{ and } \frac{\partial I_1}{\partial y}$$

obtained in steps 1030 and 1035 in FIG. 10 are re-used directly for the BDOF process in step 1040. Therefore, based on these spatial gradients from PROF, the prediction refinement $\Delta I_B$ can be generated by:

Equation 19

Prediction refinement for BDOF re-using the spatial gradients from PROF $$\Delta I_B(x, y) = \frac{\left(\frac{\partial I_1}{\partial x}(x, y) - \frac{\partial I_0}{\partial x}(x, y)\right) * \Delta v_{xB}(x, y) + \left(\frac{\partial I_1}{\partial y}(x, y) - \frac{\partial I_0}{\partial y}(x, y)\right) * \Delta v_{yB}(x, y)}{2}$$

In this case, the generation of final prediction $I_B$ can be simplified as the following:

Simplification of adjusting the bi-prediction samples with the combination of BDOF and PROF $$I_B(x, y) = \frac{I_{P0}(x, y) + I_{P1}(x, y)}{2} + \Delta I_B(x, y)$$

$$= \frac{I_0(x, y) + \Delta I_{P0}(x, y) + I_1(x, y) + \Delta I_{P1}(x, y)}{2} +$$

$$\frac{\left(\frac{\partial I_1}{\partial x}(x, y) - \frac{\partial I_0}{\partial x}(x, y)\right) * \Delta v_{xB}(x, y) + \left(\frac{\partial I_1}{\partial y}(x, y) - \frac{\partial I_0}{\partial y}(x, y)\right) * \Delta v_{yB}(x, y)}{2}$$

$$= \left( I_0(x, y) + I_1(x, y) + \frac{\partial I_0}{\partial x}(x, y) * \Delta v_{x0}(x, y) + \frac{\partial I_1}{\partial x}(x, y) * \Delta v_{x1}(x, y) + \frac{\partial I_0}{\partial y}(x, y) * \Delta v_{y0}(x, y) + \frac{\partial I_1}{\partial y}(x, y) * \Delta v_{y1}(x, y) \right) / 2.$$

Equation 20 where:

$$\Delta v_{x0}(x,y) = \Delta v_{xP0}(x,y) - \Delta v_{xB}(x,y)$$

$$\Delta v_{x1}(x,y) = \Delta v_{xP1}(x,y) + \Delta v_{xB}(x,y)$$

$$\Delta v_{y0}(x,y) = \Delta v_{yP0}(x,y) - \Delta v_{yB}(x,y)$$

$$\Delta v_{y1}(x,y) = \Delta v_{yP1}(x,y) + \Delta v_{yB}(x,y)$$

Figure 11:
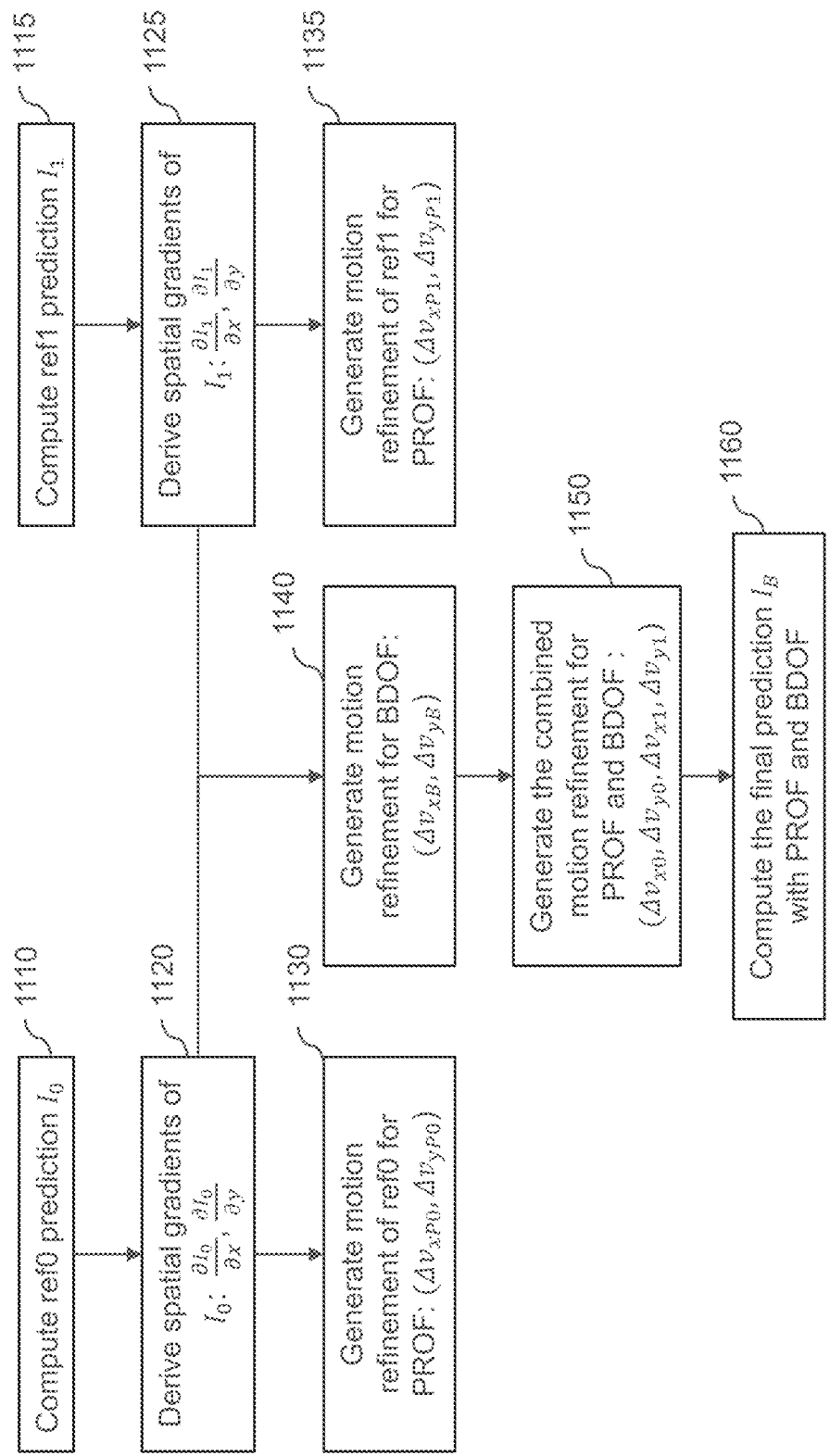
FIG. 11 illustrates a method of generating the final prediction when PROF and BDOF are combined, according to another embodiment.

Therefore, this simplification of the combination of PROF and BDOF can further change the prediction refinement derivation and the final prediction correction process, as illustrated in FIG. 11.

After obtaining the motion-compensated prediction signals $I_0$ from reference 0 and $I_1$ from reference 1 separately as in step 1110 and step 1115, the horizontal and vertical spatial gradients $$\frac{\partial I_0}{\partial x}, \frac{\partial I_0}{\partial y}, \frac{\partial I_1}{\partial x} \text{ and } \frac{\partial I_1}{\partial y}$$

are derived using $I_0$ and $I_1$ in step 1120 and step 1125.

Then the motions refinements of PROF and BDOF are generated based on these spatial gradients in steps 1130, 1135 and 1140 using Equation 15 and Equation 19. The combined motion refinements for PROF and BDOF ($\Delta v_{x0}$, $\Delta v_{y0}$, $\Delta v_{x1}$, $\Delta v_{y1}$) are derived (1150) for the following process. The steps to calculate the prediction refinements with PROF $\Delta I_{P0}$ and $\Delta I_{P1}$, and the corresponding corrected prediction signals $I_{P0}$ and $I_{P1}$ are skipped in this embodiment. Instead, the final prediction $I_B$ using the combined refinements of PROF and BDOF is derived directly in step 1160 with Equation 20.

Advantageously, these simplifications can reduce several overlapped calculations, and reduce the memory accesses.

Bi-Prediction Refinement in Affine Mode

Figure 12:
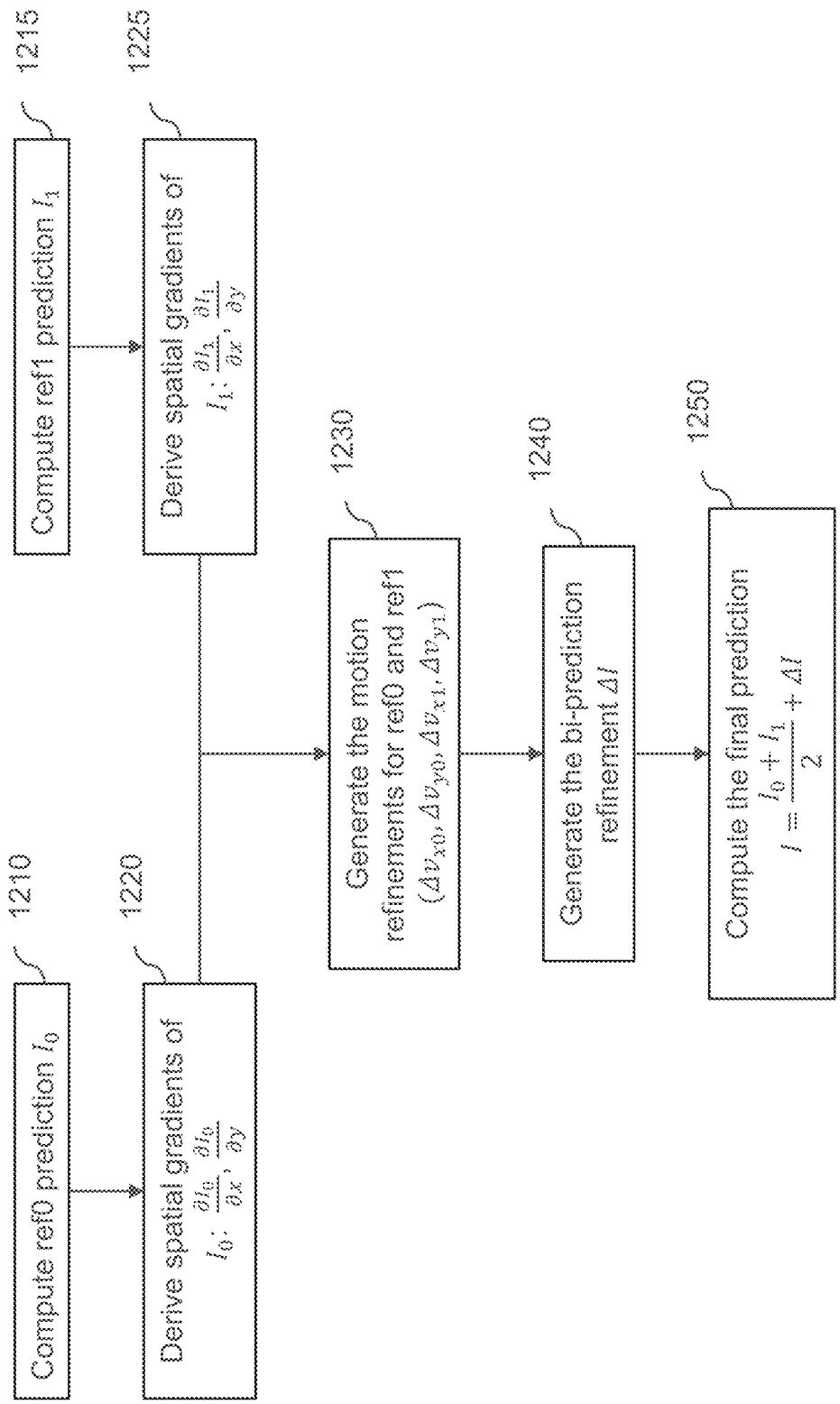
FIG. 12 illustrates a method of bi-prediction refinement in affine mode, according to an embodiment.

In the above, BDOF based on the temporal optical flow model and PROF based on the spatial optical flow model can be combined. More generally, in one embodiment, the present application proposes a bi-prediction refinement in affine based on the spatial and temporal optical flow models, which describe the relation of motion velocity and the luminance change in spatial and temporal domain respectively. To achieve a finer granularity of sub-block based affine motion compensation, luma prediction sample is refined by adding a difference derived by the optical flow equation. The proposed bi-prediction refinement in affine is shown in FIG. 12 and described in the following.

Firstly, the sub-block-based affine motion compensations are performed in two reference picture lists to generate sub-block predictions $I_0$ and $I_1$ in step 1210 and step 1215. In step 1220 and step 1225, the horizontal and vertical spatial gradients, $$\frac{\partial I_0}{\partial x}, \frac{\partial I_0}{\partial y}, \frac{\partial I_1}{\partial x} \text{ and } \frac{\partial I_1}{\partial y}$$

of the two sub-block prediction signals are then derived, for example, by directly calculating the difference between two neighboring samples as described before. The sub-block prediction is extended by one pixel on each side for the gradient calculation, for example, the pixels on the extended borders are copied from the nearest integer pixel position in the reference picture.

Subsequently, the motion refinements from the two reference pictures lists, ($\Delta v_{x0}$, $\Delta v_{y0}$) and ($\Delta v_{x1}$, $\Delta v_{y1}$) are calculated in step 1230. Based on the motion refinements and the gradients, the bi-prediction refinement $\Delta I$ is calculated for each sample in the 4×4 sub-block as shown in step 1240:

Generate the bi-prediction refinement      Equation 21

$$\Delta I(x, y) = \frac{\partial I_0}{\partial x}(x, y) * \Delta v_{x0}(x, y) + \frac{\partial I_1}{\partial x}(x, y) * \Delta v_{x1}(x, y) + \frac{\partial I_0}{\partial y}(x, y) * \Delta v_{y0}(x, y) + \frac{\partial I_1}{\partial y}(x, y) * \Delta v_{y1}(x, y).$$

Finally, the luma prediction refinement is added to the sub-block predictions to generate (1250) the final prediction as the following:

Prediction with the proposed bi-prediction refinement in affine      Equation 22

$$I = \frac{I_0 + I_1}{2} + \Delta I.$$

Advantageously, this proposed bi-prediction refinement uses the temporal and spatial optical flow models to achieve sample-wise correction of affine prediction samples. Furthermore, considering the refinements from bi-direction gives an even finer affine prediction.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, for example, the motion compensation modules (270, 375), of a video encoder 200 and decoder 300 as shown in FIG. 2 and FIG. 3. Moreover, the present aspects are not limited to VVC or HEVC, and can be applied, for example, to other standards and recommendations, and extensions of any such standards and recommendations. Unless indicated otherwise, or technically precluded, the aspects described in this application can be used individually or in combination.

Various numeric values are used in the present application. The specific values are for example purposes and the aspects described are not limited to these specific values.

Various implementations involve decoding. "Decoding," as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input video sequence in order to produce an encoded bitstream.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a quantization matrix for de-quantization. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method, comprising:
accessing a block to be decoded in affine mode, said block including a plurality of sub-blocks;
for one sub-block of said plurality of sub-blocks, obtaining a first and second prediction block, from a first and second reference picture, respectively, using sub-block based affine motion-compensated prediction, said one block in a bi-prediction mode;
obtaining motion refinement for said one sub-block, based on said first and second prediction blocks and spatial gradients in said first and second prediction blocks, according to a temporal optical flow model and a spatial optical flow model, wherein said motion refinement for said one sub-block is based on a linear combination of a motion difference according to said spatial optical flow model and an initial motion refinement for said one sub-block according to said temporal optical flow model;
obtaining a prediction adjustment for said one sub-block, based on said motion refinement and said spatial gradients; and
decoding said one sub-block based on said prediction adjustment, said first prediction block and said second prediction block.

2. The method of claim 1, wherein said obtaining a prediction adjustment comprises:
scaling a horizontal gradient and a vertical gradient for said first prediction block by a horizontal motion refinement and a vertical motion refinement for said first prediction block, respectively; and
scaling a horizontal gradient and a vertical gradient for said second prediction block by a horizontal motion refinement and a vertical motion refinement for said second prediction block, respectively.

3. The method of claim 2, further comprising:
obtaining a motion difference between a motion vector at a sample level and a motion vector for said first prediction block, for each sample in said first prediction block,
wherein said horizontal motion refinement and said vertical motion refinement for said first prediction block are obtained based on said motion difference.

4. The method of claim 1, wherein said first and second prediction blocks and spatial gradients in said first and second prediction blocks are directly used for said motion refinement and said prediction adjustment for said one sub-block.

5. An apparatus, comprising one or more processors, wherein said one or more processors are configured to:
access a block to be decoded in affine mode, said block including a plurality of sub-blocks;
for one sub-block of said plurality of sub-blocks, obtain a first and second prediction block, from a first and second reference picture, respectively, using sub-block based affine motion-compensated prediction, said one block in a bi-prediction mode;
obtain motion refinement for said one sub-block, based on said first and second prediction blocks and spatial gradients in said first and second prediction blocks, according to a temporal optical flow model and a spatial optical flow model, wherein said motion refinement for said one sub-block is based on a linear combination of a motion difference according to said spatial optical flow model and an initial motion refinement for said one sub-block according to said temporal optical flow model;
obtain a prediction adjustment for said one sub-block, based on said motion refinement and said spatial gradients; and
decode said one sub-block based on said prediction adjustment, said first prediction block and said second prediction block.

6. The apparatus of claim 5, wherein said one or more processors are further configured to:
scale a horizontal gradient and a vertical gradient for said first prediction block by a horizontal motion refinement and a vertical motion refinement for said first prediction block, respectively; and
scale a horizontal gradient and a vertical gradient for said second prediction block by a horizontal motion refinement and a vertical motion refinement for said second prediction block, respectively.

7. The apparatus of claim 6, wherein said one or more processors are further configured to:
obtain a motion difference between a motion vector at a sample level and a motion vector for said first prediction block, for each sample in said first prediction block,
wherein said horizontal motion refinement and said vertical motion refinement for said first prediction block are obtained based on said motion difference.

8. The apparatus of claim 5, wherein said first and second prediction blocks and spatial gradients in said first and second prediction blocks are directly used for said motion refinement and said prediction adjustment for said one sub-block.

9. A method, comprising:
accessing a block to be encoded in affine mode, said block including a plurality of sub-blocks;
for one sub-block of said plurality of sub-blocks, obtaining a first and second prediction block, from a first and second reference picture, respectively, using sub-block based affine motion-compensated prediction, said one block in a bi-prediction mode;
obtaining motion refinement for said one sub-block, based on said first and second prediction blocks and spatial gradients in said first and second prediction blocks, according to a temporal optical flow model and a spatial optical flow model, wherein said motion refinement for said one sub-block is based on a linear combination of a motion difference according to said spatial optical flow model and an initial motion refinement for said one sub-block according to said temporal optical flow model;

obtaining a prediction adjustment for said one sub-block, based on said motion refinement and said spatial gradients; and encoding said one sub-block responsive to said prediction adjustment, said first prediction block and said second prediction block.

10. The method of claim 9, wherein said obtaining a prediction adjustment comprises:

scaling a horizontal gradient and a vertical gradient for said first prediction block by a horizontal motion refinement and a vertical motion refinement for said first prediction block, respectively; and scaling a horizontal gradient and a vertical gradient for said second prediction block by a horizontal motion refinement and a vertical motion refinement for said second prediction block, respectively.

11. The method of claim 10, further comprising:

obtaining a motion difference between a motion vector at a sample level and a motion vector for said first prediction block, for each sample in said first prediction block, wherein said horizontal motion refinement and said vertical motion refinement for said first prediction block is obtained based on said motion difference.

12. The method of claim 9, wherein said first and second prediction blocks and spatial gradients in said first and second prediction blocks are directly used for said motion refinement and said prediction adjustment for said one sub-block.

13. An apparatus, comprising one or more processors, wherein said one or more processors are configured to:

access a block to be encoded in affine mode, said block including a plurality of sub-blocks;

for one sub-block of said plurality of sub-blocks, obtain a first and second prediction block, from a first and second reference picture, respectively, using sub-block based affine motion-compensated prediction, said one block in a bi-prediction mode;

obtain motion refinement for said one sub-block, based on said first and second prediction blocks and spatial gradients in said first and second prediction blocks, according to a temporal optical flow model and a spatial optical flow model, wherein said motion refinement for said one sub-block is based on a linear combination of a motion difference according to said spatial optical flow model and an initial motion refinement for said one sub-block according to said temporal optical flow model;

obtain a prediction adjustment for said one sub-block, based on said motion refinement and said spatial gradients; and encode said one sub-block responsive to said prediction adjustment, said first prediction block and said second prediction block.

14. The apparatus of claim 13, wherein said one or more processors are further configured to:

scale a horizontal gradient and a vertical gradient for said first prediction block by a horizontal motion refinement and a vertical motion refinement for said first prediction block, respectively; and scale a horizontal gradient and a vertical gradient for said second prediction block by a horizontal motion refinement and a vertical motion refinement for said second prediction block, respectively.

15. The apparatus of claim 14, wherein said one or more processors are further configured to:

obtain a motion difference between a motion vector at a sample level and a motion vector for said first prediction block, for each sample in said first prediction block, wherein said horizontal motion refinement and said vertical motion refinement for said first prediction block is obtained based on said motion difference.

16. The apparatus of claim 13, wherein said first and second prediction blocks and spatial gradients in said first and second prediction blocks are directly used for said motion refinement and said prediction adjustment for said one sub-block.

* * * * *